United States Patent
Thubert et al.

(10) Patent No.: US 8,925,084 B2
(45) Date of Patent: Dec. 30, 2014

(54) DENIAL-OF-SERVICE ATTACK PROTECTION

(71) Applicant: Cisco Technology, Inc., San Diego, CA (US)

(72) Inventors: Pascal Thubert, La Colle sur Loup (FR); Eric Levy-Abegnoli, Valbonne (FR); Vincent J. Ribiere, Biot (FR)

(73) Assignee: Cisco Technology, Inc., San Jose, CA (US)

( * ) Notice: Subject to any disclaimer, the term of this patent is extended or adjusted under 35 U.S.C. 154(b) by 145 days.

(21) Appl. No.: 13/662,023

(22) Filed: Oct. 26, 2012

(65) Prior Publication Data

US 2014/0123278 A1 May 1, 2014

(51) Int. Cl.
*H04L 29/06* (2006.01)
*H04L 12/781* (2013.01)

(52) U.S. Cl.
CPC ............. *H04L 63/1458* (2013.01); *H04L 45/52* (2013.01)
USPC .......................................................... 726/23

(58) Field of Classification Search
CPC .................... H04L 63/1458; H04L 45/52
USPC .......................................................... 726/23
See application file for complete search history.

(56) References Cited

U.S. PATENT DOCUMENTS

| | | | |
|---|---|---|---|
| 7,000,250 B1 * | 2/2006 | Kuo et al. | 726/22 |
| 7,171,683 B2 | 1/2007 | Pazi et al. | |
| 7,266,754 B2 | 9/2007 | Shah et al. | |
| 7,409,712 B1 | 8/2008 | Brooks et al. | |
| 7,424,741 B1 | 9/2008 | Grimm et al. | |
| 7,587,760 B1 | 9/2009 | Day | |
| 7,725,934 B2 | 5/2010 | Kumar et al. | |
| 7,979,694 B2 | 7/2011 | Touitou et al. | |
| 8,156,557 B2 | 4/2012 | Touitou et al. | |
| 8,312,541 B2 | 11/2012 | Levy-Abegnoli et al. | |
| 8,561,181 B1 * | 10/2013 | Hernacki et al. | 726/22 |
| 2004/0004941 A1 * | 1/2004 | Malan et al. | 370/254 |
| 2004/0093512 A1 * | 5/2004 | Sample | 713/201 |
| 2004/0098618 A1 * | 5/2004 | Kim et al. | 713/201 |
| 2006/0021054 A1 * | 1/2006 | Costa et al. | 726/25 |
| 2007/0016663 A1 * | 1/2007 | Weis | 709/223 |
| 2007/0291945 A1 * | 12/2007 | Chuang et al. | 380/270 |
| 2008/0162679 A1 * | 7/2008 | Maher et al. | 709/223 |
| 2009/0077632 A1 * | 3/2009 | Carpenter et al. | 726/3 |
| 2010/0169975 A1 * | 7/2010 | Stefanidakis et al. | 726/25 |

OTHER PUBLICATIONS

Marques, et al., "Dissemination of Flow Specification Rules", Network Working Group, Request for Comments 5575, Aug. 2009, 22 pages, Internet Engineering Task Force Trust.

* cited by examiner

*Primary Examiner* — Michael S McNally
(74) *Attorney, Agent, or Firm* — Parker Ibrahim & Berg LLC

(57) ABSTRACT

In one embodiment, a device detects a denial-of-service attack and generates a message in response to the detection of the denial-of-service attack. The message is then virally distributed to a plurality of subscribed devices.

18 Claims, 3 Drawing Sheets

DENIAL-OF-SERVICE ATTACK PROTECTION

TECHNICAL FIELD

The present disclosure relates generally to computer networks, and, more particularly, to denial-of-service (DOS) attack protection for computer networks.

BACKGROUND

In the case of a denial-of-service attack, many things need to be done at the various nodes/devices (e.g., routers, switches, etc.) in the network to protect the network and the nodes/devices. Some actions will require an analysis of the DOS attack and, thus, specific command-line interface (CLI) actions. However, these actions take time for both the analysis and entering CLI. At times, the DOS attack is such that the CLI hardly responds and the counter measures take too long to apply. There are also some actions that can be taken blindly to "raise the shield" and protect the network, such as throttling more punted packets, throttling the multicast operations, stopping IPv6 neighbor discovery (ND) and address resolution protocol (ARP) lookups, giving greater precedence to CLI, etc.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device detects a denial-of-service attack and generates a message in response to the detection of the denial-of-service attack. The message can then be virally distributed to a plurality of subscribed devices or posted for review by other devices.

Description

A computer network is a geographically distributed collection of nodes interconnected by communication links and segments for transporting data between end nodes, such as personal computers and workstations, or other devices, such as servers, routers, switches, sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others.

A wireless network, in particular, is a type of shared media network where a plurality of nodes communicate over a wireless medium, such as using radio frequency (RF) transmission through the air. For example, a Mobile Ad-Hoc Network (MANET) is a kind of wireless ad-hoc network, which is generally considered a self-configuring network of mobile routes (and associated hosts) connected by wireless links, the union of which forms an arbitrary topology.

Figure 1:
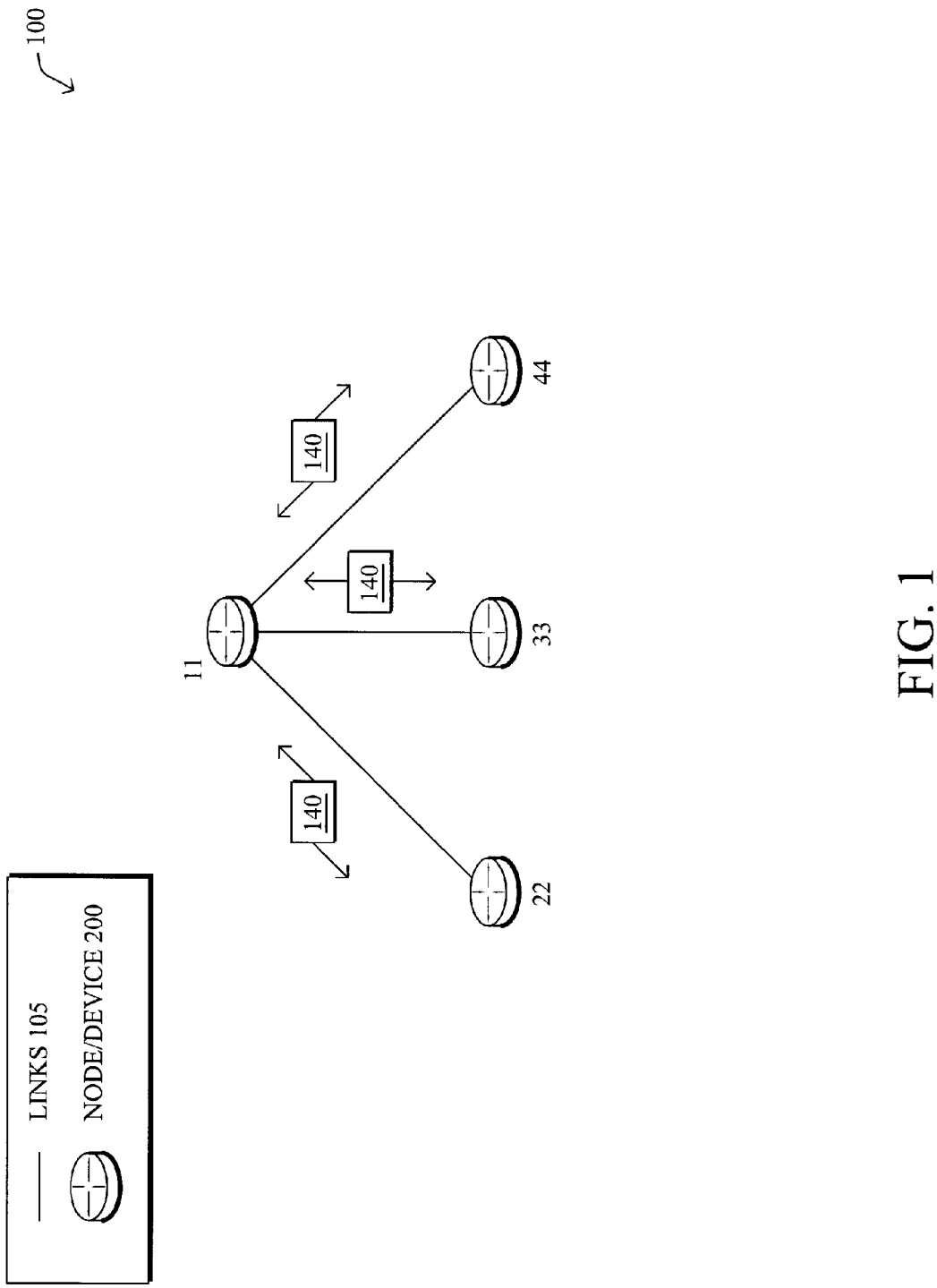
FIG. 1 illustrates an example communication network.

FIG. 1 is a schematic block diagram of an example simplified computer network 100 illustratively comprising nodes/devices 200 (e.g., labeled as shown, 11, 22, 33, and 44), which can be interconnected by various methods of communication. For instance, links 105 may be wired links or shared media (e.g., wireless links) where certain nodes/devices 200, such as, e.g., servers, routers, sensors, switches, computers, etc., may be in communication with other nodes/devices 200, e.g., based on distance, signal strength, current operational status, location, etc. Those skilled in the art will understand that any number of nodes/devices, links, etc. may be used in the network, and that the view shown herein is for simplicity. Also, those skilled in the art will further understand that while computer network 100 is shown in a certain orientation, computer network 100 is merely an example illustration that is not meant to limit the disclosure.

Data packets 140 may be exchanged among nodes/devices 200 of computer network 100 using predefined network communication protocols such as certain known wired protocols, wireless protocols, or other protocols where appropriate. In this context, a protocol consists of a set of rules defining how the nodes/devices 200 interact with each other.

Figure 2:
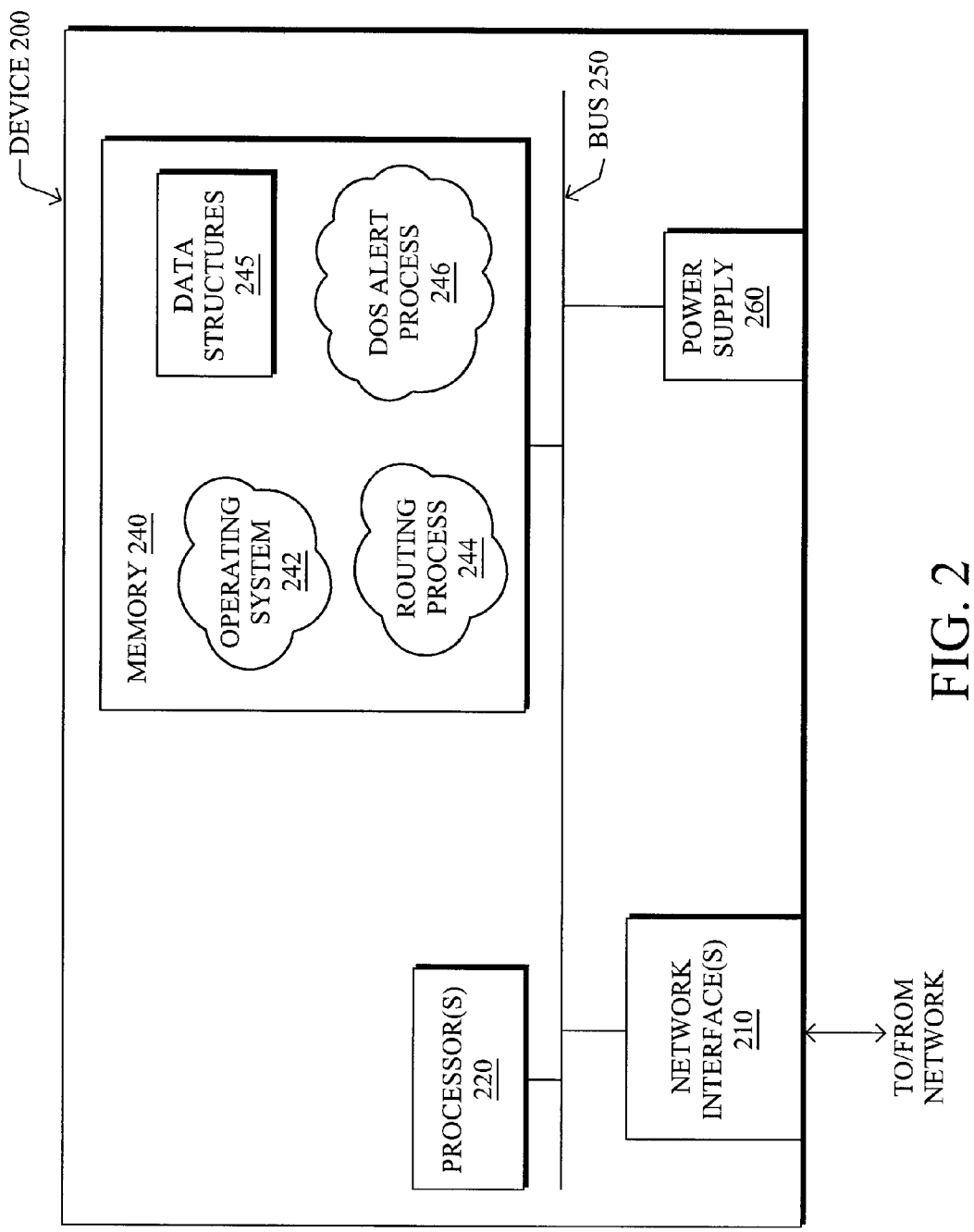
FIG. 2 illustrates an example network node/device.

FIG. 2 is a schematic block diagram of an example node/device 200 that may be used with one or more embodiments described herein, e.g., as any of the nodes/devices 200 shown in FIG. 1 above. The node/device 200 may comprise one or more network interfaces 210 (e.g., wired, wireless,), at least one processor 220, and a memory 240, all interconnected by a system bus 250, and powered by a power supply 260.

The network interface(s) 210 comprise the mechanical, electrical, and signaling circuitry for communicating data over links 105 coupled to computer network 100. The network interfaces may be configured to transmit and/or receive data using a variety of different communication protocols. Note, further, that the nodes may have two different types of network connections 210, e.g., wireless and wired/physical connections, and that the view herein is merely for illustration.

The memory 240 comprises a plurality of storage locations that are addressable by processor 220 and network interfaces 210 for storing software programs and data structures associated with the embodiments described herein. Processor 220 may comprise hardware elements or hardware logic adapted to execute the software programs and manipulate data structures 245. An operating system 242, such as the Internetwork Operating System or IOS® available from Cisco Systems, Inc. of San Jose, Calif., portions of which are typically resident in memory 240 and executed by processor 220, functionally organizes the device by, inter alia, invoking operations in support of software processes and/or services executing on the device. These software processes and/or services may comprise routing process/services 244 and an illustrative DOS alert process 246, as described herein. Note that while routing process 244 and DOS alert process 246 are shown in centralized memory 240, certain embodiments provide for the processes (or portions thereof) to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 comprises computer executable instructions executed by processor 220 to perform functions provided by one or more routing protocols, such as proactive or reactive routing protocols as will be understood by those skilled in the art. These functions may, on capable devices, be configured to manage a routing/forwarding table (a data structure 245) used to make routing/forwarding decisions for data packets. In particular, in proactive routing, connectivity is discovered and known prior to computing routes to any destination in the network, e.g., link state routing such as Open Shortest Path First (OSPF), Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination.

As noted above, in the case of a denial-of-service attack, many things needs to be done at the various nodes/devices in the network to protect the network and the nodes/devices. Some actions will require an analysis of the DOS attack and, thus, specific command-line interface (CLI) actions. There are also some actions that can be taken blindly to "raise the shield" and protect the network, such as throttling more punted packets (i.e., extracted from the hardware forwarding and passed to software), throttling the multicast operations, stopping IPv6 ND and address resolution protocol (ARP) lookups, giving greater precedence to CLI, etc.

The techniques herein provide a single point of notification and control for any process that can take action to protect a network against a DOS attack or overload detection. Illustratively, the techniques described herein may be performed by hardware, software, and/or firmware, which may contain computer executable instructions executed by the processor 220 (or independent processor of interfaces 210) to perform functions relating to the techniques described herein.

Operationally, an alert is generated, either automatically or manually, when a DOS attack is detected. For manual systems, once an administrator or user detects the DOS attack, the alert can be generated through a simple CLI for older IOS platforms, like "DOS" in privileged mode, an icon on a desktop, voice recognition software, or an actual button that a user can press when the user detects a DOS attack. Access to the CLI is often compromised when a system is highly loaded from a DOS attack, therefore, when an alert is generated, the CLI precedence can be raised and the watchdog time can be lowered. For automated systems, the a DOS attack can be detected through software (e.g., monitoring network traffic or a breach attempt) or through hardware (e.g., monitoring the temperature of a computer room or the heat output of a device or system, monitoring the use of backup power, monitoring for physical intrusion, or monitoring for hard disk or cooling vibrations) and the alert automatically generated when a DOS attack is detected. One possible source of traffic and/or heat overload may be the amount of packets punted. The automated alert can be generated by a designated device and sent to device 11 or the traffic analyzer and/or thermometer can be integral to device 11. In addition, the DOS attack monitoring could have various levels of DOS attack detection probability (e.g., suspected, probable, certain, etc.) and can generate a specific alert based on the level of probability, which could be used to generate different DOS messages, as described below.

However the alert is generated, the alert is received by DOS alert process 246 of a device 200 (e.g. device 11) when a DOS attack is detected. When the alert is received, alert process 246 generates a DOS message and virally distributes the DOS message over a content delivery platform (CDP) or other similar service to all other devices 200 (e.g. devices 22, 33, and 44) that have registered with device 11 to receive DOS messages. For example, in IOS the DOS message could be a reg_invoke. Alternatively, the DOS message can be posted or saved to a known location that external devices or internal systems can monitor for DOS messages. The DOS message can contain information that an alert has been detected and instructions on what actions should be taken upon receipt of the DOS message. For example, in the context of IPv6 First Hop security (FHS), FHS can block lookups for new addresses, throttle multicast over wireless and packets punted to CPU, and/or throttle multicast flows. In addition, predefined operations can be scripted (e.g., install a restrictive certified output protection protocol (COPP) policy) that can be installed automatically when an alert is received. As discussed above, the alert received by DOS alert process 246 could vary based on the probability of the DOS attack. Based on the probability of attack in the alert, DOS alert process 246 could generate different DOS messages having various information and instructions depending on the probability of attack.

Once the DOS message is received by the devices 200 that have registered, or retrieved from the monitored location, the devices 200 execute the instructions contained in the DOS message to protect the devices 200 and the network from the DOS attack.

Figure 3:
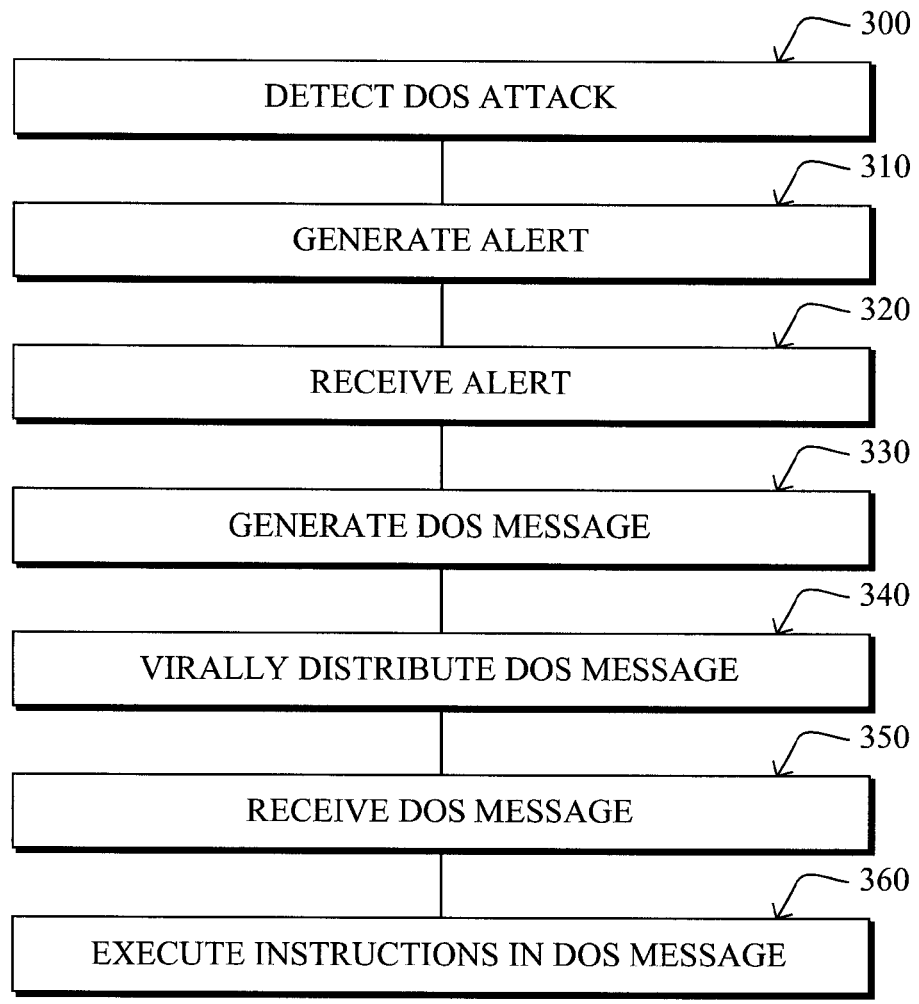
FIG. 3 illustrates an example simplified procedure for protecting computer networks from denial-of-service attacks.

FIG. 3 illustrates an example simplified procedure for DOS attack protection for computer networks in accordance with one or more embodiments described herein. The procedure may start at Step 300, where a DOS attack is detected. As described above, a DOS attack could be manually detected by an administrator or user monitoring the network or could be automatically detected using a traffic analyzer, thermometer, etc.

Once a DOS attack has been detected, at Step 310 an alert is generated that notifies a control device 200 (e.g. device 11) in the network of the detected DOS attack. As described above, for manual systems the alert can be generated through commands entered through CLI, selection of an icon on a desktop, voice commands through voice recognition software, or can even be an actual button (virtual or physical) that is pressed by a user. For automated systems, the alert can be automatically generated by the traffic analyzer or other system/device that detects the DOS attack. At Step 320, the alert is then received by the control device.

In systems where an operator generates the alert on the control device or the DOS attack is detected by the control device, Steps 310 and 320 can be eliminated as the control device is generating the alert itself.

Once the control device receives an alert, or detects the DOS attack itself, at Step 330 a DOS message is generated and the DOS message is virally distributed to other devices 200 (e.g. devices 22, 33, and 44) in the network at Step 340. Alternatively, at Step 340, the DOS message can be posted to a known location that is monitored by external devices and/or internal systems, rather than sending the DOS message.

At Step 350 the other devices in the network receive and/or retrieve the DOS message and execute the instructions contained in the DOS message at Step 360.

It should be noted that while certain steps may be optional as described above, the steps shown in FIG. 3 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for denial-of-service attack protection for computer networks, it is to be understood that various other variations, adaptations and modifications may be made within the spirit and scope of the embodiments herein, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   detecting a denial-of-service attack;
   generating a message via a processor in response to the detection of the denial-of-service attack; and
   virally distributing the message via the processor to a plurality of subscribed devices,
   wherein the message includes on instructions on actions to perform upon receipt of the message.

2. The method as in claim 1, wherein detecting the denial-of-service attack comprises receiving a denial-of-service attack alert.

3. The method as in claim 2, wherein the denial-of-service attack alert is generated by a user via at least one of a control line interface, selection of a desktop icon, and pressing a designated button.

4. The method as in claim 1, wherein the denial-of-service attack is detected using a traffic analyzer.

5. The method as in claim 1, wherein the denial-of-service attack is detected using a thermometer.

6. The method as in claim 1, wherein the instructions comprise at least one of blocking new address lookups, throttling of multicast flows, and throttling packets punted to a central processing unit.

7. The method as in claim 1, wherein the message is virally distributed via a content delivery platform.

8. An apparatus, comprising:
   a network interface adapted to communicate with plurality of subscribed devices over a network;
   a processor configured to communicate with the network interface; and
   a memory configured to communicate with the processor, the memory having instructions stored thereon that, in response to execution by the processor, cause the processor to perform operations comprising;
   detecting a denial-of-service attack;
   generating a message in response to the detection of the denial-of-service attack; and
   virally distributing the message via the processor to the plurality of subscribed devices,
   wherein the message includes on instructions on actions to perform upon receipt of the message.

9. The apparatus as in claim 8, wherein:
   detecting the denial-of-service attack comprises receiving a denial-of-service attack alert; and
   the denial-of-service attack alert is generated by a user.

10. The apparatus as in claim 9, wherein the denial-of-service attack alert is generated via at least one of a control line interface, selection of a desktop icon, and pressing a designated button.

11. The apparatus as in claim 8, wherein the denial-of-service attack is detected using at least one of a traffic analyzer and a thermometer.

12. The apparatus as in claim 8, wherein the instructions comprise at least one of blocking new address lookups, throttling of multicast flows, and throttling packets punted to a central processing unit.

13. The apparatus as in claim 8, wherein the message is virally distributed via a content delivery platform.

14. A tangible non-transitory computer-readable storage medium having computer-executable instructions stored thereon that, when executed by a processor, cause the processor to perform operations comprising:
   detecting a denial-of-service attack;
   generating a message in response to the detection of the denial-of-service attack; and
   virally distributing the message via the processor to the plurality of subscribed devices,
   wherein the message includes on instructions on actions to perform upon receipt of the message.

15. The computer-readable medium as in claim 14, wherein:
   detecting the denial-of-service attack comprises receiving a denial-of-service attack alert; and
   the denial-of-service attack alert is generated by a user via at least one of a control line interface, selection of a desktop icon, and pressing a designated button.

16. The computer-readable medium as in claim 14, wherein the denial-of-service attack is detected using at least one of a traffic analyzer and a thermometer.

17. The computer-readable medium as in claim 14, wherein the instructions comprise at least one of blocking new address lookups, throttling of multicast flows, and throttling packets punted to a central processing unit.

18. The computer-readable medium as in claim 14, wherein the message is virally distributed via a content delivery platform.

* * * * *